(12) United States Patent
Grant et al.

(10) Patent No.: US 10,803,095 B2
(45) Date of Patent: Oct. 13, 2020

(54) PERSONALLY IDENTIFIABLE INFORMATION DETERMINATION

(71) Applicant: International Business Machines Corporation, Armonk, NY (US)

(72) Inventors: Robert H. Grant, Atlanta, GA (US); Trudy L. Hewitt, Cary, NC (US); Brian A. O'Crowley, Dublin (IE); Jonathan Dunne, Dungarvan (IE)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 16/048,825

(22) Filed: Jul. 30, 2018

(65) Prior Publication Data

US 2020/0034476 A1 Jan. 30, 2020

(51) Int. Cl.

| | | |
|---|---|---|
| *G06F 16/00* | (2019.01) | |
| *G06F 16/28* | (2019.01) | |
| *G06N 20/00* | (2019.01) | |
| *G06F 21/62* | (2013.01) | |

(52) U.S. Cl.
CPC ........... *G06F 16/285* (2019.01); *G06N 20/00* (2019.01); *G06F 21/6245* (2013.01)

(58) Field of Classification Search
CPC .... G06F 16/285; G06F 21/6245; G06N 20/00
See application file for complete search history.

(56) References Cited

U.S. PATENT DOCUMENTS

| | | | | |
|---|---|---|---|---|
| 7,302,569 | B2 * | 11/2007 | Betz | G06F 21/6245 713/167 |
| 8,561,185 | B1 * | 10/2013 | Muthusrinivasan | G06F 21/6245 705/51 |
| 2008/0228868 | A1 | 9/2008 | Sivakoff | |
| 2010/0036884 | A1 * | 2/2010 | Brown | G06Q 30/00 706/21 |
| 2017/0161520 | A1 * | 6/2017 | Lockhart, III | G06F 21/6263 |

(Continued)

OTHER PUBLICATIONS

Geng et al., "Using Data Mining Methods to Predict Personally Identifiable Information in Emails," The Fourth International Conference on Advanced Data Mining and Applications (ADMA 2008), Chengdu, China, Oct. 2008, 13 pages.

(Continued)

*Primary Examiner* — Jared M Bibbee
(74) *Attorney, Agent, or Firm* — Van Leeuwen & Van Leeuwen; Christopher M. Pignato

(57) ABSTRACT

An approach is provided in which a system analyzes a first set of data to derive a first distribution output that is based on a first conjugated distribution corresponding to the first set of data and a domain class model. The system utilizes the first distribution output as a baseline input to generate a second conjugated distribution corresponding to a second set of data and the domain class model. Next, the system derives a second distribution output of the second set of data based on the second conjugated distribution. The second distribution output identifies at least one personally identifiable information (PII) data field corresponding to the second set of data that was not identified as a PII data field in the domain class model. In turn, the system tags at least a portion of the second set of data as PII based on the derived second distribution output.

20 Claims, 6 Drawing Sheets

(56) References Cited

U.S. PATENT DOCUMENTS

2018/0268306 A1* 9/2018 Laine ............... G06F 21/6254
2019/0080063 A1* 3/2019 Rice ................ G06F 21/6245

OTHER PUBLICATIONS

Han et al., "Automatic Document Metadata Extraction using Support Vector Machines," Proceedings of the 2003 Joint Conference on Digital Libraries (JCDL '03), Houston, Texas, May 2003, 12 pages.
"TermSet Security Guide," TermSet, Mar. 2018, 6 pages.
Neethiraj, "Tag Based Policies," Apache Software Foundation, Oct. 2015, 11 pages.
"Watson Discovery," International Business Machines Corporation, Aug. 2015, 10 pages.
"Watson Knowledge Studio," International Business Machines Corporation, Aug. 2015, 3 pages.

* cited by examiner

PERSONALLY IDENTIFIABLE INFORMATION DETERMINATION

BACKGROUND

General Data Protection Regulation (GDPR) legislation requires businesses to protect personally identifiable information (PII). The concept of PII has become prevalent as information technology and the Internet have made it easier to collect PII, leading to a profitable market in collecting and reselling PII. PII can also be exploited by criminals to stalk or steal the identity of a person or to aid in the planning of criminal acts, such as opening lines of credit, purchasing goods or services, and depleting bank accounts.

As a result of the GDPR legislation, certain types of data and metadata (data fields and metadata fields) will be classified as PII. A challenge, however, is that classification of new data/metadata fields as PII is an evolving process. Therefore, a data/metadata field may not be PII classified today but will be PII classified in the near future as technology changes. For example, an identifier or a specific code may be generated by a process in isolation and a transient dependency developed to link the specific code to a user process. As such, this once isolated code is now linked to other user information and by definition inherits PII properties.

As described herein, PII is any information relating to an identified or identifiable natural person. An identifiable natural person is one who can be identified, directly or indirectly, in particular by reference to information such as a name, an identification number, location data, an online identifier or to one or more factors specific to the physical, physiological, genetic, mental, economic, cultural or social identity of that natural person. Also as described herein, data refers to data and/or metadata and a PII data field is any data field or metadata field containing PII.

BRIEF SUMMARY

According to one embodiment of the present disclosure, an approach is provided in which a system analyzes a first set of data to derive a first distribution output that is based on a first conjugated distribution corresponding to the first set of data and a domain class model. The system utilizes the first distribution output as a baseline input to generate a second conjugated distribution corresponding to a second set of data and the domain class model. Next, the system derives a second distribution output of the second set of data based on the second conjugated distribution. The second distribution output identifies at least one personally identifiable information (PII) data field corresponding to the second set of data that was not identified as a PII data field in the domain class model. In turn, the system tags at least a portion of the second set of data as PII based on the derived second distribution output.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

According to an aspect of the present invention there is a method, system and/or computer program product that performs the following operations (not necessarily in the following order): (i) deriving a first distribution output of a first set of data based on a first conjugated distribution corresponding to the first set of data and a domain class model; (ii) utilizing the first distribution output as a baseline input to generate a second conjugated distribution corresponding to a second set of data and the domain class model; (iii) deriving a second distribution output of the second set of data based on the second conjugated distribution, wherein the second distribution output identifies at least one personally identifiable information (PII) data field corresponding to the second set of data that was not identified as a PII data field in the domain class model; and (iv) tagging at least a portion of the second set of data as PII based on the derived second distribution output.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
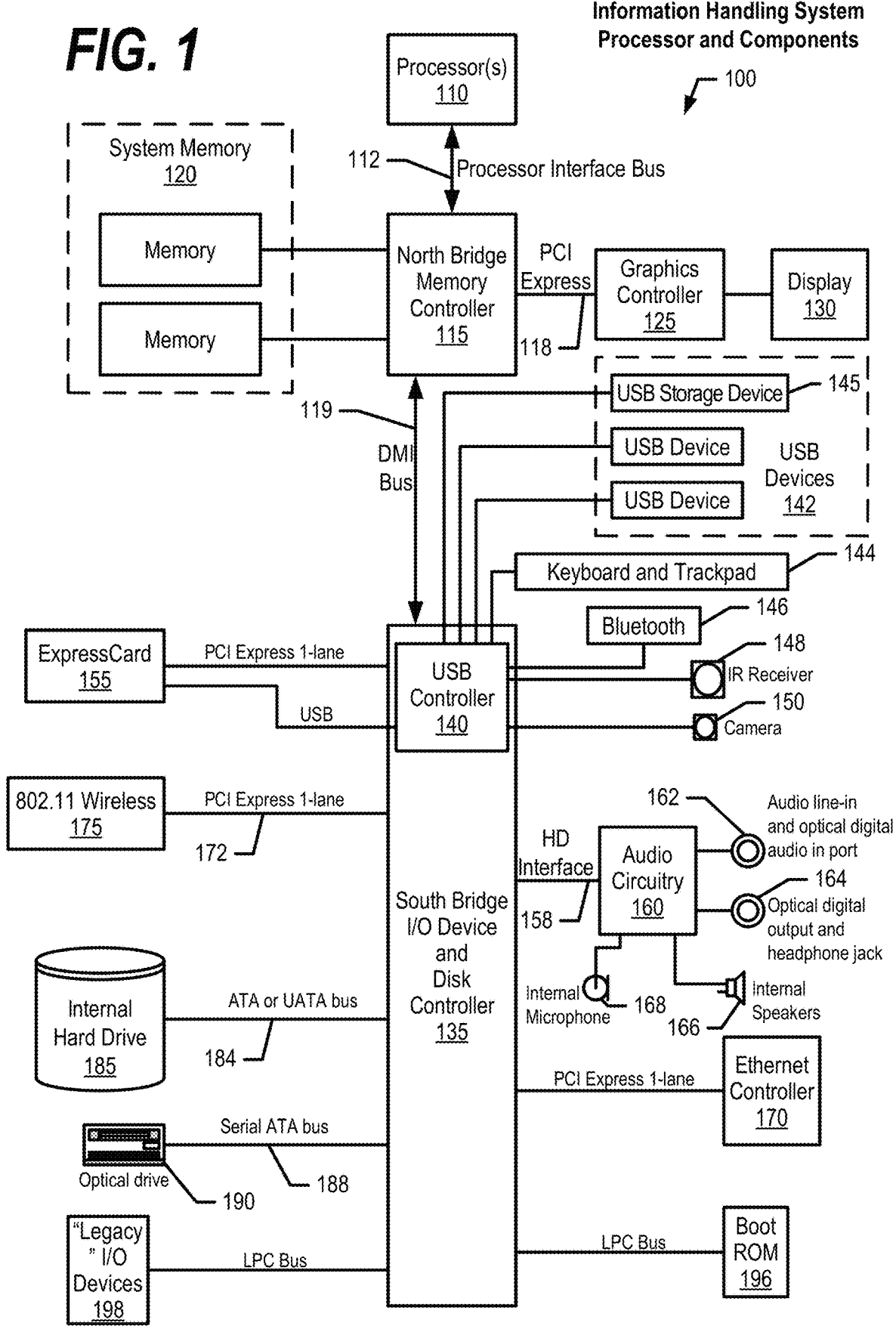
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
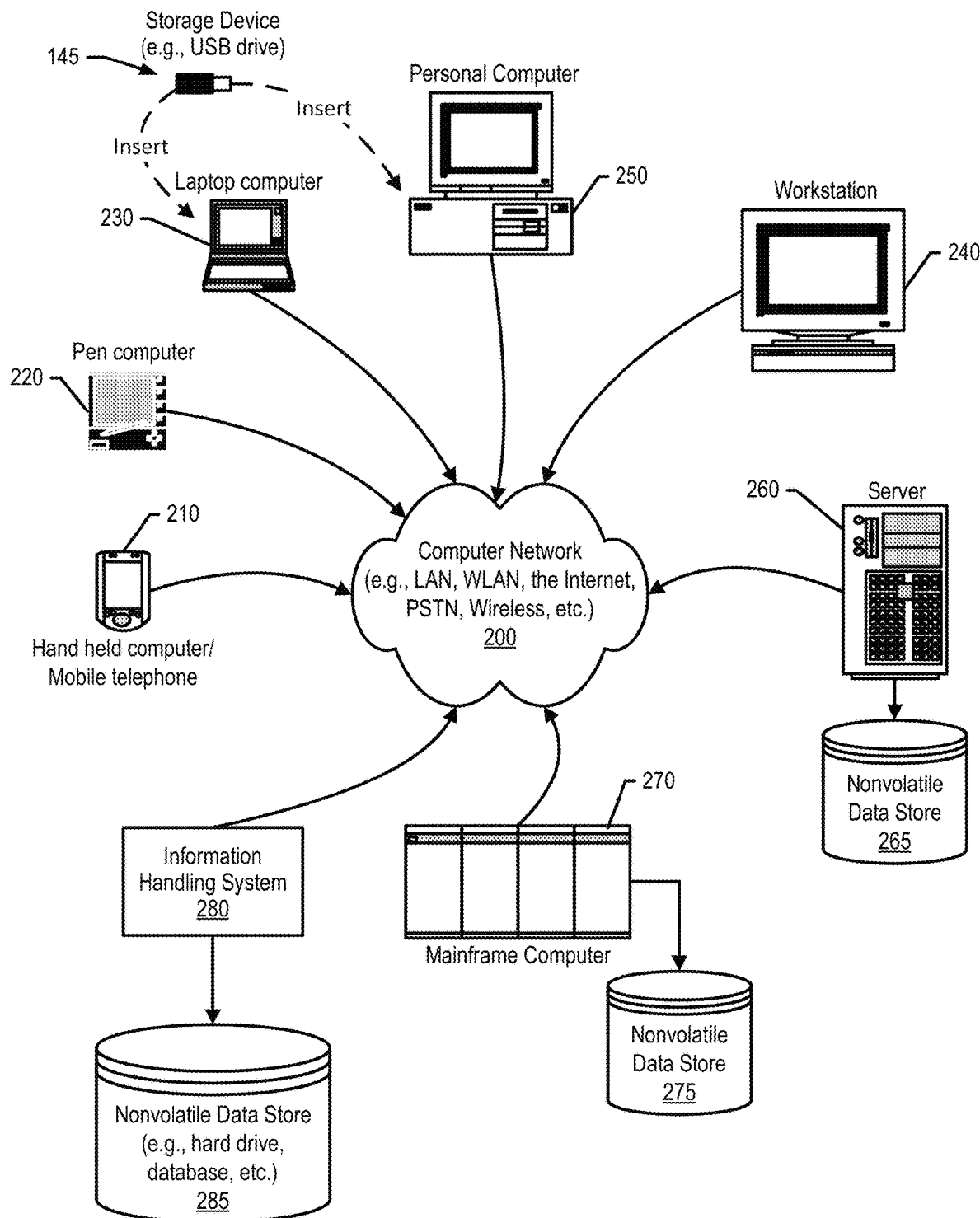
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, challenges exist to identify personally identifiable information (PII) data fields, and especially to predict candidate PII data fields, which are data fields not currently classified as PII but are predicted to be classified as PII data fields in the future. The approach discussed herein solves these challenges by linking a domain class model to a machine learning component and performing multiple iterations over multiple sets of data that, in turn, derives a posterior distribution that includes predicted data fields requiring PII protection in the future.

Figure 3:
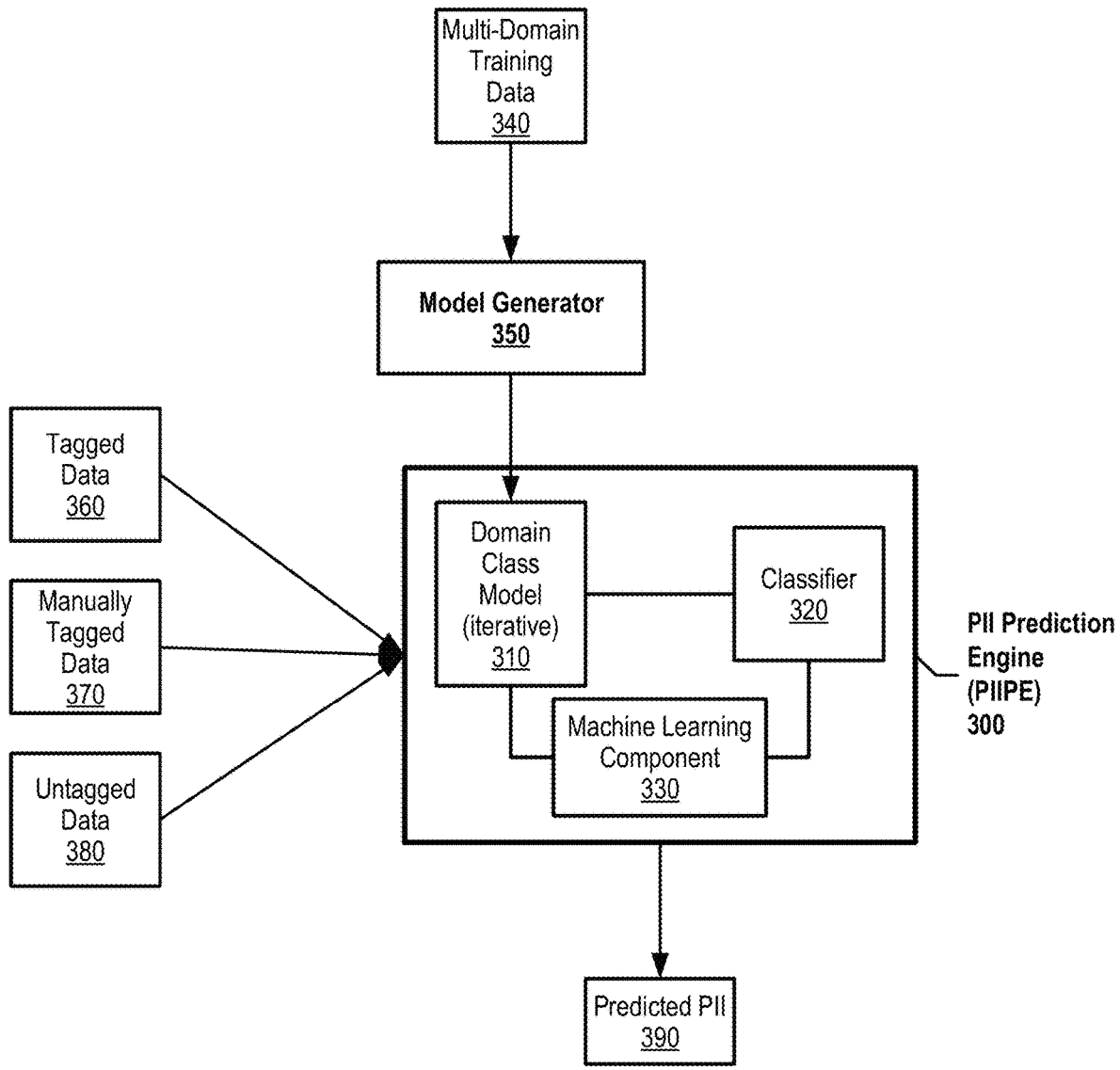
FIG. 3 is an exemplary diagram depicting a PII prediction engine 300 performing multiple iterations over sets of data to predict data/metadata fields requiring future PII protection.

FIG. 3 is an exemplary diagram depicting a PII prediction engine 300 performing multiple iterations over sets of data to predict data fields requiring future PII protection. Prior to PII prediction engine 300 analyzing data and performing multiple iterations, model generator 350 creates domain class model 310 based on multi-domain training data 340. Model generator 350 analyzes multi-domain training data 340 to determine the types of data classified as PII in multi-domain training data 340. Then, model generator 350 derives domain class model 310 that identifies PII data fields based on the analysis.

In one embodiment, model generator 350 analyzes multivariate categorical data to assign a class (PII class) to each category. When new categorical data is presented, domain class model 310 looks for the presence of available classes with this new data and, in turn, classifies categorical data with a high maximum likelihood estimation as PII. In this embodiment, class mappings are as simple as "PII" or "NOTPII," more complex with multi-branches and greater levels of granularity. In this embodiment, Akaike Information Criterion (AIC) and/or Bayesian information criterion (BIC) are used for cross validation.

Domain class model 310 is then wired to classifier 320 and machine learning component 330 (e.g. Logistic Regression, Naive Bayes, SVM, Tensor Flow, etc.), which forms PII prediction engine 300. As discussed below, classifier 320, in one embodiment, is a binomial classifier that tags data based on domain class model 310, and machine learning component 330 identifies future candidate PII data fields based on past classifications.

In one embodiment, PII prediction engine 300 uses Bayesian statistics to predict future candidate PII. A Bayesian design of experiments uses an "influence of prior beliefs" approach. This approach uses sequential analysis techniques to include the outcome of earlier experiments in the design of the next experiment. This is achieved by updating 'beliefs' through the use of prior and posterior distribution (the distribution of possible unobserved values conditional on the observed values).

PII prediction engine 300 receives tagged data 360, which is a set of data that is PII tagged based on previous PII information. For example, a 'lastname" data field may be PII tagged. PII prediction engine 300 analyzes tagged data 360 and generates a first conjugated distribution based on tagged data 360 relative to domain class model 310's initial baseline input (multi-domain training data 340). As described herein, a baseline input is also referred to herein as a "prior belief" or "prior belief input." PII prediction engine 300, in turn, derives a first posterior distribution based on the first conjugated distribution and the initial prior belief (see FIG. 4 and corresponding text for further details).

Next, PII prediction engine 300 uses the derived first posterior distribution as a prior belief input for the next iteration (see FIG. 4 and corresponding text for further details) and analyzes manually tagged data 370. Manually tagged data 370 is a set of data that is manually PII tagged based on current PII information. For example, a 'firstname" data field is manually tagged. PII prediction engine 300 analyzes manually tagged data 370 and generates a second conjugated distribution based on manually tagged data 370 relative to domain class model 310's prior belief, which is the derived first posterior distribution from the previous iteration. PII prediction engine 300, in turn, derives a second posterior distribution based on the first conjugated distribution and the prior belief.

Then, PII prediction engine 300 uses the derived second posterior distribution as a prior belief input for the next iteration. PII prediction engine 300 analyzes untagged data 380 and generates a third conjugated distribution based on untagged data 380 relative to domain class model 310's prior belief, which is the derived second posterior distribution from the previous iteration. In turn, PII prediction engine 300 uses machine learning component 330 to derive a third posterior distribution based on the second conjugated distribution and the prior belief. For example, the third posterior distribution may indicate that a 'middlename" data field is a candidate (e.g., future) PII field based on, for example, the tree structure in domain class model 310. PII prediction engine 300 then uses the third posterior distribution to tag candidate PII in untagged data 380 via classifier 320, resulting in predicted PII 390.

In one embodiment, PII prediction engine 300 uses topic modelling of text as a basis to determine whether data is PII or not. In this embodiment, PII prediction engine 300 uses the topic model to analyze the actual content to determine whether the data is PII. In another embodiment, PII prediction engine 300 determines that a particular data field includes PII data that was previously stored in a different data field. For example, a "lastname,firstname" field may include data from a "lastname" field that was tagged as a PII data field. In this example, PII prediction engine 300 determines that the "lastname,firstname" field should also be tagged as a PII data field.

Figure 4:
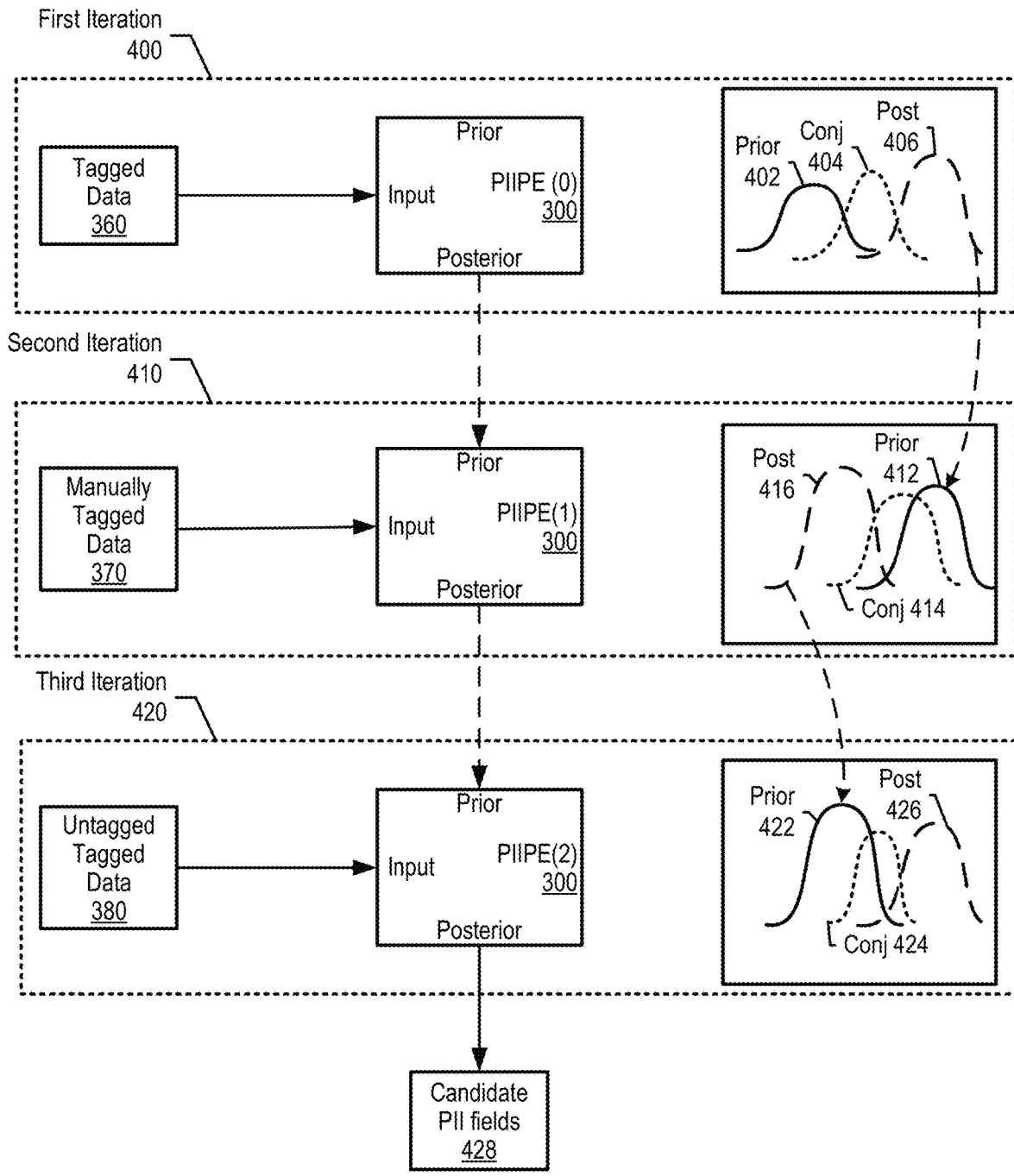
FIG. 4 is an exemplary diagram showing a domain class model iteration process as discussed herein.

FIG. 4 is an exemplary diagram showing a domain class model iteration process as discussed herein. During first iteration 400, PII prediction engine 300's prior belief distribution 402 is based on its initial training data 340. PII prediction engine 300 generates conjugated distribution 404 based on analyzing tagged data 360 against prior belief distribution 402. In turn, PII prediction engine 300 derives posterior distribution 406 based on prior belief distribution 402 and conjugated distribution 404.

During second iteration 410, PII prediction engine 300 uses posterior distribution 406 as its prior belief (prior belief distribution 412). PII prediction engine 300 generates conjugated distribution 414 based on analyzing manually tagged data 370 against prior belief distribution 412. In turn, PII prediction engine 300 derives posterior distribution 416 based on prior belief distribution 412 and conjugated distribution 414.

During third iteration 420, PII prediction engine 300 uses posterior distribution 416 as its prior belief (prior belief distribution 422). PII prediction engine 300 generates conjugated distribution 424 based on analyzing untagged data 370 against prior belief distribution 422. Machine learning component 330 then evaluates when tagging was successful (candidate PII data fields) and when tagging was unsuccessful and modifies domain class model 310 accordingly. In turn, posterior distribution 426 identifies candidate PII fields 428, which are data fields that are currently not classified as PII but are predicted to be PII classified in the future.

Figure 5:
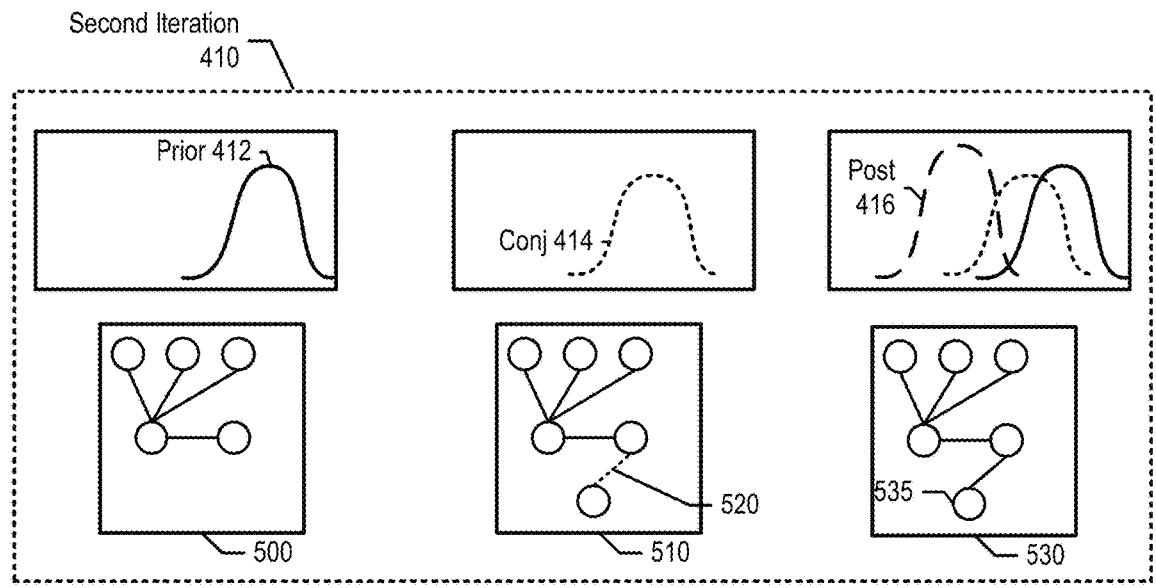
FIG. 5 is an exemplary diagram showing domain class model modifications that occur over iterations of datasets.
Figure 5:
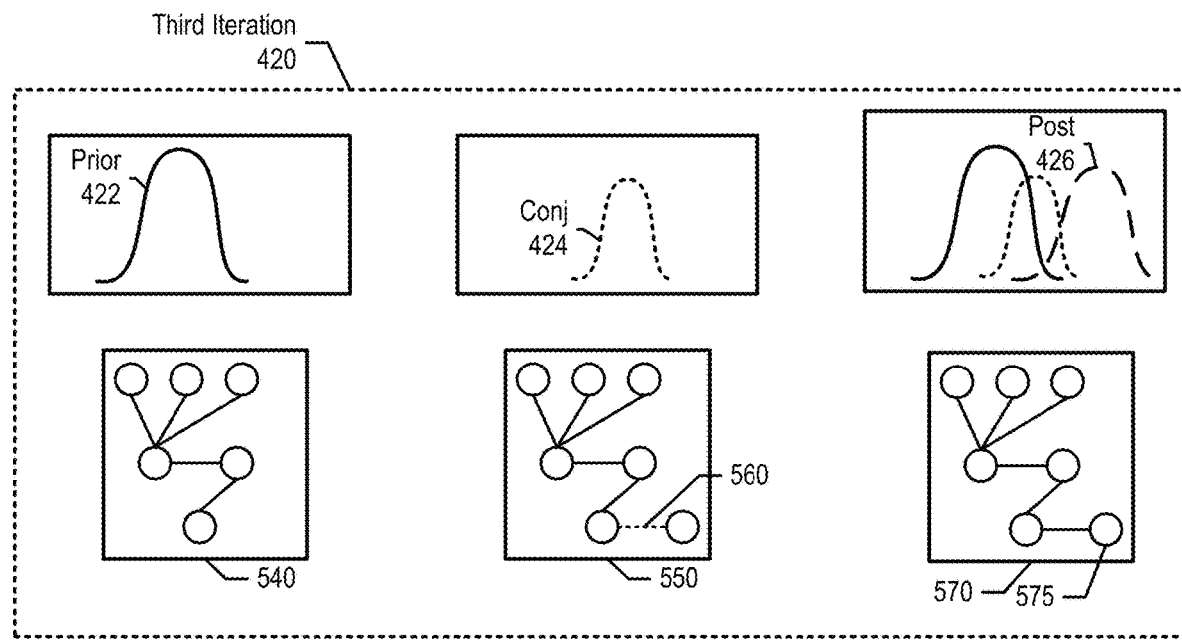

FIG. 5 is an exemplary diagram showing domain class model modifications that occur over iterations of datasets. Second iteration 410 shows prior belief distribution 412 and corresponding model state 500, which is a visual representation of PII classified data fields. Conjugated distribution 414 adds a potential branch 520 to the PII classified data fields based on manually tagged data 370 (model state 510). Posterior distribution 416 becomes the union of both prior distribution 412 and the observed data represented as a conjugated distribution 414 (model state 530), which identifies data field (node) 535 as PII FIG. 5 shows third iteration 420 starting with prior belief distribution 422 and corresponding model state 540, which is the same as posterior distribution 416 and model state 530, respectively. Conjugated distribution 424 adds a potential branch 560 to the PII classified data fields (model state 550). Posterior distribution 416 becomes the union of both prior distribution 422 and the observed data represented as a conjugated distribution 424 (model state 570), which includes data field 575 that is predicted to include PII in the future based on historical iterations.

Figure 6:
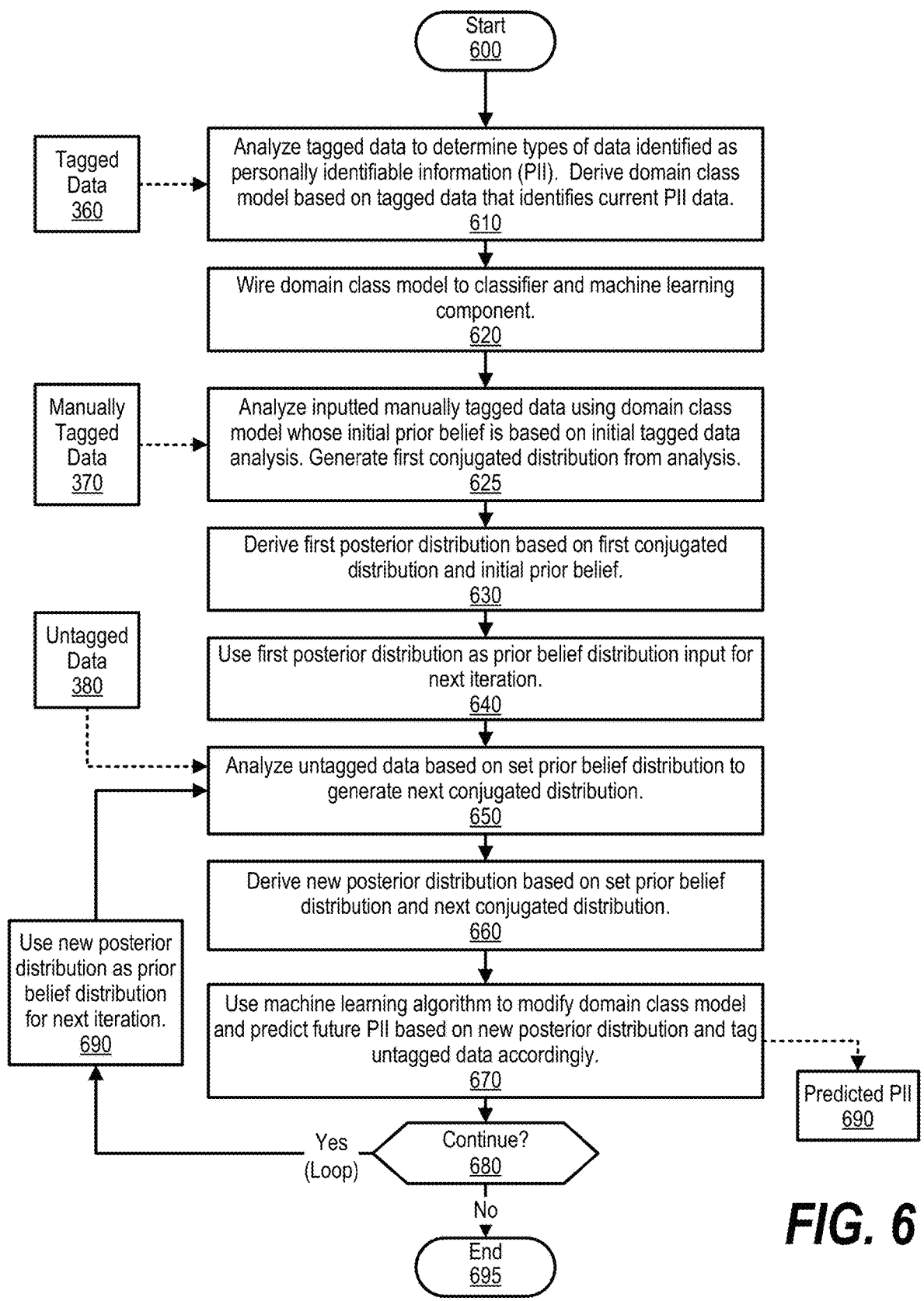
FIG. 6 is an exemplary flowchart showing steps taken to iteratively analyze data and predict candidate PII data/metadata fields.

FIG. 6 is an exemplary flowchart showing steps taken to iteratively analyze data and predict candidate PII data fields. FIG. 6 processing commences at 600 whereupon, at step 610, the process analyzes tagged data 360 to determine data fields (types) identified as personally identifiable information (PII), and derives a domain class model based on the identified PII data fields.

At step 620, the process wires (links) the domain class model to a classifier and a machine learning component. As discussed above, the classifier tags incoming data and the machine learning component (e.g., Logistic Regression, Naive Bayes, SVM, Tensor Flow) identifies future candidate PII data fields based on prior results).

At step 625, the process analyzes manually tagged data 370 using the domain class model whose initial prior belief is based on the initial tagged data analysis. The process generates a first conjugated distribution from the analysis (see FIG. 4 and corresponding text for further details). At step 630, the process derives a first posterior distribution (first distribution output) based on the first conjugated distribution and the initial prior belief. At step 640, the process uses the first posterior distribution as a prior belief input distribution for the next iteration (see FIG. 4 and corresponding text for further details).

At step 650, the process analyzes untagged data 380 based on the prior belief distribution (first posterior distribution) to generate a next conjugated distribution. At step 660, the process derives a new posterior distribution based on the set prior belief distribution and the next conjugated distribution. At step 670, the process uses machine learning component 330 to modify the domain class model and predict future PII based on the new posterior distribution and tag untagged metadata 360 accordingly.

The process determines as to whether to continue to iteratively evaluate and modify the domain class model (decision 680). If the process should continue, then decision 680 branches to the 'yes' branch. At step 690, the process uses the new posterior distribution as a prior belief distribution for the next iteration. This looping continues until the process should terminate, at which point decision 680 branches to the 'no' branch exiting the loop. FIG. 6 processing thereafter ends at 695.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   deriving a first distribution output of a first set of data based on a first conjugated distribution corresponding to the first set of data and a domain class model;
   utilizing the first distribution output as a baseline input to generate a second conjugated distribution corresponding to a second set of data and the domain class model;
   deriving a second distribution output of the second set of data based on the second conjugated distribution, wherein the second distribution output identifies at least one personally identifiable information (PII) data field corresponding to the second set of data that was not identified as a PII data field in the domain class model; and
   tagging at least a portion of the second set of data as PII based on the derived second distribution output.

2. The method of claim 1 further comprising:
   analyzing the second conjugated distribution by a machine learning component, wherein the analyzing identifies one or more successful PII classifications of the second set of data; and
   adjusting the domain class model based on the analyzing of the second conjugated distribution.

3. The method of claim 2 wherein, in response to adjusting the domain class model, the method further comprises:
   iteratively re-adjusting the domain class model based on subsequent analysis of a plurality of subsequent sets of data.

4. The method of claim 1 wherein, prior to the deriving of the first distribution output, the method further comprises:
   determining a set of datatypes classified as PII based on analyzing a set of tagged data; and
   utilizing the determined set of datatypes as the baseline input to generate the first conjugated distribution corresponding to the first set of data, wherein the first set of data is a set of manually tagged data.

5. The method of claim 4 further comprising:
   deriving the domain class model based on the determined set of datatypes classified as PII.

6. The method of claim 1 further comprising:
   determining that the at least one PII data field comprises PII data in response to detecting that the PII data was previously stored in a different PII data field.

7. The method of claim 1 wherein the at least one PII data field is a metadata field that links to a data field comprising PII data.

8. An information handling system comprising:
   one or more processors;
   a memory coupled to at least one of the processors;

a set of computer program instructions stored in the memory and executed by at least one of the processors in order to perform actions of:
    deriving a first distribution output of a first set of data based on a first conjugated distribution corresponding to the first set of data and a domain class model;
    utilizing the first distribution output as a baseline input to generate a second conjugated distribution corresponding to a second set of data and the domain class model;
    deriving a second distribution output of the second set of data based on the second conjugated distribution, wherein the second distribution output identifies at least one personally identifiable information (PII) data field corresponding to the second set of data that was not identified as a PII data field in the domain class model; and
    tagging at least a portion of the second set of data as PII based on the derived second distribution output.

9. The information handling system of claim 8 wherein the processors perform additional actions comprising:
    analyzing the second conjugated distribution by a machine learning component, wherein the analyzing identifies one or more successful PII classifications of the second set of data; and
    adjusting the domain class model based on the analyzing of the second conjugated distribution.

10. The information handling system of claim 9 wherein, in response to adjusting the domain class model, the processors perform additional actions comprising:
    iteratively re-adjusting the domain class model based on subsequent analysis of a plurality of subsequent sets of data.

11. The information handling system of claim 8 wherein, prior to the deriving of the first distribution output, the processors perform additional actions comprising:
    determining a set of datatypes classified as PII based on analyzing a set of tagged data; and
    utilizing the determined set of datatypes as the baseline input to generate the first conjugated distribution corresponding to the first set of data, wherein the first set of data is a set of manually tagged data.

12. The information handling system of claim 11 wherein the processors perform additional actions comprising:
    deriving the domain class model based on the determined set of datatypes classified as PII.

13. The information handling system of claim 8 wherein the processors perform additional actions comprising:
    determining that the at least one PII data field comprises PII data in response to detecting that the PII data was previously stored in a different PII data field.

14. The information handling system of claim 8 wherein the at least one PII data field is a metadata field that links to a data field comprising PII data.

15. A computer program product stored in a computer readable storage medium, comprising computer program code that, when executed by an information handling system, causes the information handling system to perform actions comprising:
    deriving a first distribution output of a first set of data based on a first conjugated distribution corresponding to the first set of data and a domain class model;
    utilizing the first distribution output as a baseline input to generate a second conjugated distribution corresponding to a second set of data and the domain class model;
    deriving a second distribution output of the second set of data based on the second conjugated distribution, wherein the second distribution output identifies at least one personally identifiable information (PII) data field corresponding to the second set of data that was not identified as a PII data field in the domain class model; and
    tagging at least a portion of the second set of data as PII based on the derived second distribution output.

16. The computer program product of claim 15 wherein the information handling system performs further actions comprising:
    analyzing the second conjugated distribution by a machine learning component, wherein the analyzing identifies one or more successful PII classifications of the second set of data; and
    adjusting the domain class model based on the analyzing of the second conjugated distribution.

17. The computer program product of claim 16 wherein, in response to adjusting the domain class model, the information handling system performs further actions comprising:
    iteratively re-adjusting the domain class model based on subsequent analysis of a plurality of subsequent sets of data.

18. The computer program product of claim 15 wherein, prior to the deriving of the first distribution output, the information handling system performs further actions comprising:
    determining a set of datatypes classified as PII based on analyzing a set of tagged data; and
    utilizing the determined set of datatypes as the baseline input to generate the first conjugated distribution corresponding to the first set of data, wherein the first set of data is a set of manually tagged data.

19. The computer program product of claim 18 wherein the information handling system performs further actions comprising:
    deriving the domain class model based on the determined set of datatypes classified as PII.

20. The computer program product of claim 15 wherein the information handling system performs further actions comprising:
    determining that the at least one PII data field comprises PII data in response to detecting that the PII data was previously stored in a different PII data field.

\* \* \* \* \*